US008462884B2

(12) United States Patent
Kim et al.

(10) Patent No.: US 8,462,884 B2
(45) Date of Patent: Jun. 11, 2013

(54) RECEIVING APPARATUS AND RECEIVING METHOD

(75) Inventors: Hyung Jung Kim, Daejeon (KR); Jae Hyung Kim, Changwon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 328 days.

(21) Appl. No.: 12/873,734

(22) Filed: Sep. 1, 2010

(65) Prior Publication Data

US 2011/0051869 A1 Mar. 3, 2011

(30) Foreign Application Priority Data

Sep. 1, 2009 (KR) .................. 10-2009-0082087
Aug. 26, 2010 (KR) .................. 10-2010-0083077

(51) Int. Cl.
*H03K 9/00* (2006.01)

(52) U.S. Cl.
USPC ........................................................ 375/316

(58) Field of Classification Search
USPC .. 375/316, 219, 148, 350, 267, 130; 702/189; 370/342
See application file for complete search history.

(56) References Cited

U.S. PATENT DOCUMENTS

| 5,999,575 | A | 12/1999 | Tanaka et al. | |
|---|---|---|---|---|
| 6,714,529 | B1 | 3/2004 | Tanabe et al. | |
| 7,277,501 | B2 | 10/2007 | Mori et al. | |
| 7,327,775 | B1 * | 2/2008 | Gu ................................ | 375/130 |
| 7,957,938 | B2 * | 6/2011 | LaMarche et al. ............ | 702/189 |
| 2003/0193923 | A1 * | 10/2003 | Abdelgany et al. ........... | 370/342 |
| 2004/0102172 | A1 | 5/2004 | Hendin | |
| 2006/0045126 | A1 | 3/2006 | Klahn et al. | |
| 2006/0281429 | A1 * | 12/2006 | Kishi et al. ..................... | 455/313 |
| 2007/0002961 | A1 * | 1/2007 | Hoctor et al. .................. | 375/267 |
| 2007/0140382 | A1 | 6/2007 | Qian | |
| 2008/0159453 | A1 * | 7/2008 | Smith ............................ | 375/350 |
| 2008/0240316 | A1 | 10/2008 | Yokoshima et al. | |
| 2009/0190633 | A1 * | 7/2009 | Smith ............................ | 375/148 |
| 2010/0118923 | A1 * | 5/2010 | Pal ................................. | 375/219 |

FOREIGN PATENT DOCUMENTS

| EP | 1 435 687 A1 | 7/2004 |
|---|---|---|
| JP | 09-200165 | 7/1997 |
| JP | 2001-111639 | 4/2001 |
| JP | 2003-318759 A | 11/2003 |

(Continued)

OTHER PUBLICATIONS

Mahajan A, et al., A Novel Method for Down-Conversion of Multiple Bandpass Signals, IEEE Transactions on Wireless Communications, vol. 5, No. 2, Feb. 1, 2006, pp. 427-434.

*Primary Examiner* — Daniel Washburn
*Assistant Examiner* — Fitwi Hailegiorgis
(74) *Attorney, Agent, or Firm* — Kile Park Reed & Houtteman PLLC

(57) ABSTRACT

A receiving apparatus includes: RF filters for selecting and outputting a signal to be down-converted from among a plurality of received signals having different bands; a phase conversion unit for generating a phase difference between output signals of the filters and down-converting the output signals of the filters to output a plurality of sample signals; a quantization unit for converting the plurality of sample signals from discrete signals into digital signals; and a signal separation unit for separating and outputting each of a plurality of output signals corresponding to the plurality of received signals from the output signals of the quantization unit by using a phase shift value caused by the phase difference.

16 Claims, 5 Drawing Sheets

FOREIGN PATENT DOCUMENTS

| | | |
|---|---|---|
| JP | 2004-104772 A | 4/2004 |
| JP | 2004-515962 | 5/2004 |
| JP | 2005-529544 | 9/2005 |
| KR | 10-2006-0121126 A | 11/2006 |
| KR | 10-2007-0066674 A | 6/2007 |
| WO | 02/47285 | 6/2002 |
| WO | 03/105390 | 12/2003 |

* cited by examiner

RECEIVING APPARATUS AND RECEIVING METHOD

CROSS-REFERENCE TO RELATED APPLICATION

This application claims priority to and the benefit of Korean Patent Application No. 10-2009-0082087 and 10-2010-0083077 filed in the Korean Intellectual Property Office on Sep. 1, 2009 and Aug. 26, 2010, the entire contents of which are incorporated herein by reference.

BACKGROUND OF THE INVENTION (a) Field of the Invention

The present invention relates to a receiving apparatus and a receiving method.

(b) Description of the Related Art

A receiving apparatus of a wireless communication system receives a radio frequency (RF) signal transmitted from a transmitting apparatus and performs processes such as filtering, amplification, frequency conversion, analog-to-digital conversion, etc.

When performing these processes by receiving an RF signal analog signal which is an analog signal, a sampling frequency which is at least twice a carrier frequency is required to enable a sampling theorem to be applied. In general, however, a bandwidth where a signal exists may be 0.003 to 0.2% of a carrier frequency. Accordingly, a reception process may be very inefficient and the amount of data to be processed becomes extremely large.

To overcome this, a band-pass sampling (BPS) scheme is used. The band-pass sampling (BPS) scheme, where the sampling frequency is determined based on a bandwidth of a signal without depending on the carrier frequency, may allow an effective system to be designed. As described above, a technology that processes an input signal as a digital and uses a narrow bandwidth is referred to as a digital direct conversion scheme or an RF direct conversion scheme. In terms of an algorithm, the technology may also be referred to as a BPS, a harmonic sampling, or a sub-sampling.

Such a BPS reception scheme, which uses a sampling frequency lower than the Nyquist rate for intentionally generating aliasing, basically has a sample rate based on a bandwidth of information. The BPS reception scheme is based on a theory that an analog down-converting function is replaceable with a sampling, and performs sampling of a signal received through an antenna directly after passing a low noise amplifier (LNA), and thus, a chip and small receiving apparatus may be embodied.

A receiving apparatus of the BPS reception scheme may perform down-conversion of an integer-position signal with a minimum sample rate twice a sample rate of a bandwidth, and may perform down-conversion of a non-integer position signal with a minimum sample rate greater than twice the sample rate of the bandwidth. However, the sampling frequency varies according to the location of a signal band, and the sample rate is required to be changed according to the bandwidth of a signal and the location of a band to perform universal access, and thus, there is a difficulty that the bandwidth of an RF filter is required to be varied.

There has recently been proposed a receiving apparatus using a scheme that performs sampling of a signal to have a relative time delay using two paths, and eliminates aliasing using a signal process. With this scheme, the sample rate is selected without considering the aliasing depending on the location of a signal, and the minimum sampling frequency equal to the bandwidth of the signal may be selected. However, if the sample rate of an input signal is equal to the bandwidth, when the receiving apparatus is sampled with the bandwidth, aliasing may occur.

Moreover, the main purpose of such receiving apparatuses is mainly to down-convert one RF signal. If one RF signal of a band desired to be received and RF signals of different bands are simultaneously received and processed, aliasing occurs to the RF signals of the different bands. That is, aliasing generally occurs when a plurality of RF signals are received and processed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a receiving apparatus of wireless communication which simultaneously receives and processes RF signals of at least one band properly and, at the same time, efficiently perform down-conversion of RF signals of different bands.

An exemplary embodiment of the present invention provides a receiving apparatus, including: RF filters for selecting and outputting a signal to be down-converted from among a plurality of received signals having different bands; a phase conversion unit for generating a phase difference between output signals of the filters and down-converting the output signals of the filters to output a plurality of sample signals; a quantization unit for converting the plurality of sample signals from discrete signals into digital signals; and a signal separation unit for separating and outputting each of a plurality of output signals corresponding to the plurality of received signals from the output signals of the quantization unit by using a phase shift value caused by the phase difference.

The plurality of received signals may include a first received signal, a second received signal, and a third received signal, and the plurality of output signals may include a first output signal corresponding to the first received signal, a second output signal corresponding to the second received signal, and a third output signal corresponding to the third received signal.

The signal separation unit may include: a first interpolant for receiving a first signal, which is any one of the output signals of the quantization unit, and outputting a fourth output signal; a second interpolant for receiving a second signal, which is any one of the output signals of the quantization unit, and outputting a fifth output signal; a first adder for adding the fourth output signal and the fifth output signal; a low pass filter for receiving the addition result of the first adder and selecting and outputting the first output signal; and a high pass filter for receiving the addition result of the first adder and selecting and outputting the second output signal.

If the absolute value of a frequency is less than a bandwidth, the filter coefficient value of the first interpolant may be the reciprocal of the bandwidth and otherwise 0.

If the frequency is between a negative value of the bandwidth and 0, the filter coefficient value of the second interpolant may be a value obtained by dividing a negative value of the phase shift of a negative frequency component of the third received signal by the bandwidth, if the frequency is between 0 and the bandwidth, the filter coefficient value of the second interpolant may be a value obtained by dividing a negative value of the phase shift of a positive frequency component of the third received signal by the bandwidth, and otherwise 0.

If the frequency is between 0 and the center frequency of the first output signal and the second output signal, the first output signal may be 1 and otherwise 0.

If the frequency is between the center frequency and half of a sampling frequency, the second output signal may be 1 and otherwise 0.

The signal separation unit may further include: a third interpolant for receiving the second signal and outputting a sixth output signal; and a second adder for adding the fourth output signal and the sixth output signal to output the third output signal.

if the frequency is between a negative value of half a sampling frequency and a negative value of the center frequency of the first output signal and the second output signal, the filter coefficient value of the third interpolant may be a value obtained by dividing a negative value of the phase shift of a negative frequency component of the second received signal by the bandwidth, if the frequency is between a negative value of the center frequency and 0, the filter coefficient value of the third interpolant may be a value obtained by dividing a negative value of the phase shift of a negative frequency component of the first received signal by the bandwidth, if the frequency is between 0 and the center frequency, the filter coefficient value of the third interpolant may be a value obtained by dividing a negative value of the phase shift of a positive frequency component of the first received signal by the bandwidth, if the frequency is between the center frequency and half of the sampling frequency, the filter coefficient value of the third interpolant may be a value obtained by dividing a negative value of the phase shift of a positive frequency component of the second received signal by the bandwidth, and otherwise 0.

The phase conversion unit may include at least one sampler for receiving clock signals having a time difference and generating the phase difference.

The RF filters may include at least one bandpass filter.

Another exemplary embodiment of the present invention provides a receiving apparatus, which down-converts a first received signal, second received signal, and third received signal of different bands by different phase shift values, and outputs a first output signal corresponding to the first received signal, a second output signal corresponding to the second received signal, and a third output signal corresponding to the third received signal, the apparatus including: a first interpolant that has a filter coefficient value equal to the reciprocal of a bandwidth if the absolute value of a frequency is less than the bandwidth, and otherwise a filter coefficient value of 0, and outputs a fourth output signal; a second interpolant that has a filter coefficient value equal to a value obtained by dividing a negative value of the phase shift of a negative frequency component of the third received signal by the bandwidth if the frequency is between a negative value of the bandwidth and 0, a filter coefficient value equal to a value obtained by dividing a negative value of the phase shift of a positive frequency component of the third received signal by the bandwidth if the frequency is between 0 and the bandwidth, and otherwise a filter coefficient value of 0, and outputs a fifth output signal; a first adder for adding the fourth output signal and the fifth output signal to output a sixth output signal; a low pass filter that receives the sixth output signal and outputs 1 as the first output signal if the frequency is between 0 and the center frequency of the first output signal and the second output signal, and otherwise 0; a high pass filter that receives the sixth output signal and outputs 1 as the second output signal if the frequency is between the center frequency and half of a sampling frequency, and otherwise 0; a third interpolant that has a filter coefficient value equal to a value obtained by dividing a negative value of the phase shift of a negative frequency component of the second received signal by the bandwidth if the frequency is between a negative value of half the sampling frequency and a negative value of the center frequency, a filter coefficient value equal to a value obtained by dividing a negative value of the phase shift of a negative frequency component of the first received signal by the bandwidth if the frequency is between a negative value of the center frequency and 0, a filter coefficient value equal to a value obtained by dividing a negative value of the phase shift of a positive frequency component of the first received signal by the bandwidth if the frequency is between 0 and the center frequency, a filter coefficient value equal to a value obtained by dividing a negative value of the phase shift of a positive frequency component of the second received signal by the bandwidth if the frequency is between the center frequency and half of the sampling frequency, and otherwise a filter coefficient value of 0, and outputs a seventh output signal; and a second adder for adding the fourth output signal and the seventh output signal to output the third output signal.

Another exemplary embodiment of the present invention provides a receiving method, which receives a plurality of received signals having different bands, the method including: generating a phase difference between the plurality of received signals and down-converting the plurality of received signals to output a plurality of sample signals; converting the plurality of sample signals from discrete signals into digital signals; and separating and outputting each of a plurality of output signals corresponding to the plurality of received signals from the plurality of sample signals converted into the digital signals by using a phase shift value caused by the phase difference.

The plurality of received signals may include a first received signal, a second received signal, and a third received signal, and the plurality of output signals may include a first output signal corresponding to the first received signal, a second output signal corresponding to the second received signal, and a third output signal corresponding to the third received signal, wherein the separating and outputting may include: receiving a first signal including the plurality of sample signals converted into the digital signal and outputting a fourth output signal; receiving a second signal including the plurality of sample signals converted into the digital signals having different phase shift values and outputting a fifth output signal; adding the fourth output signal and the fifth output signal; selecting and outputting the first output signal from the addition result; and selecting and outputting the second output signal from the addition result.

The receiving of the first signal and outputting of the fourth output signal may be performed based on a filter coefficient value which is equal to the reciprocal of a bandwidth if the absolute value of a frequency is less than a bandwidth and otherwise is 0.

The receiving of the second signal and outputting of the fifth output signal may be performed based on a filter coefficient value which is equal to a value obtained by dividing a negative value of the phase shift of a negative frequency component of the third received signal by the bandwidth if the frequency is between a negative value of the bandwidth and 0, is equal to a value obtained by dividing a negative value of the phase shift of a positive frequency component of the third received signal by the bandwidth if the frequency is between 0 and the bandwidth, and otherwise is 0.

If the frequency is between 0 and the center frequency of the first output signal and the second output signal, the first output signal may be 1 and otherwise 0.

If the frequency is between the center frequency and half of a sampling frequency, the second output signal may be 1 and otherwise 0.

The separating and outputting may further include: receiving the second signal and outputting a sixth output signal; and adding the fourth output signal and the sixth output signal to output the third output signal.

The receiving of the second signal and outputting of the sixth output signal may be performed based on a filter coefficient value which is equal to a value obtained by dividing a negative value of the phase shift of a negative frequency component of the second received signal by the bandwidth if the frequency is between a negative value of half a sampling frequency and a negative value of the center frequency of the first output signal and the second output signal, is equal to a value obtained by dividing a negative value of the phase shift of a negative frequency component of the first received signal by the bandwidth if the frequency is between a negative value of the center frequency and 0, is equal to a value obtained by dividing a negative value of the phase shift of a positive frequency component of the first received signal by the bandwidth if the frequency is between 0 and the center frequency, is equal to a value obtained by dividing a negative value of the phase shift of a positive frequency component of the second received signal by the bandwidth if the frequency is between the center frequency and half of the sampling frequency, and otherwise is 0.

According to the present invention, a receiving apparatus of wireless communication can simultaneously receive and process RF signals of different band properly and efficiently perform down-conversion of the RF signals. Accordingly, a total of three RF signals can be properly received by detecting two RF signals of different bands in a wideband frequency area while receiving one RF signal of a reception band properly. Moreover, a plurality of RF signals transmitted in different frequency bands can be simultaneously received properly.

DETAILED DESCRIPTION OF THE EMBODIMENTS

Figure 1:
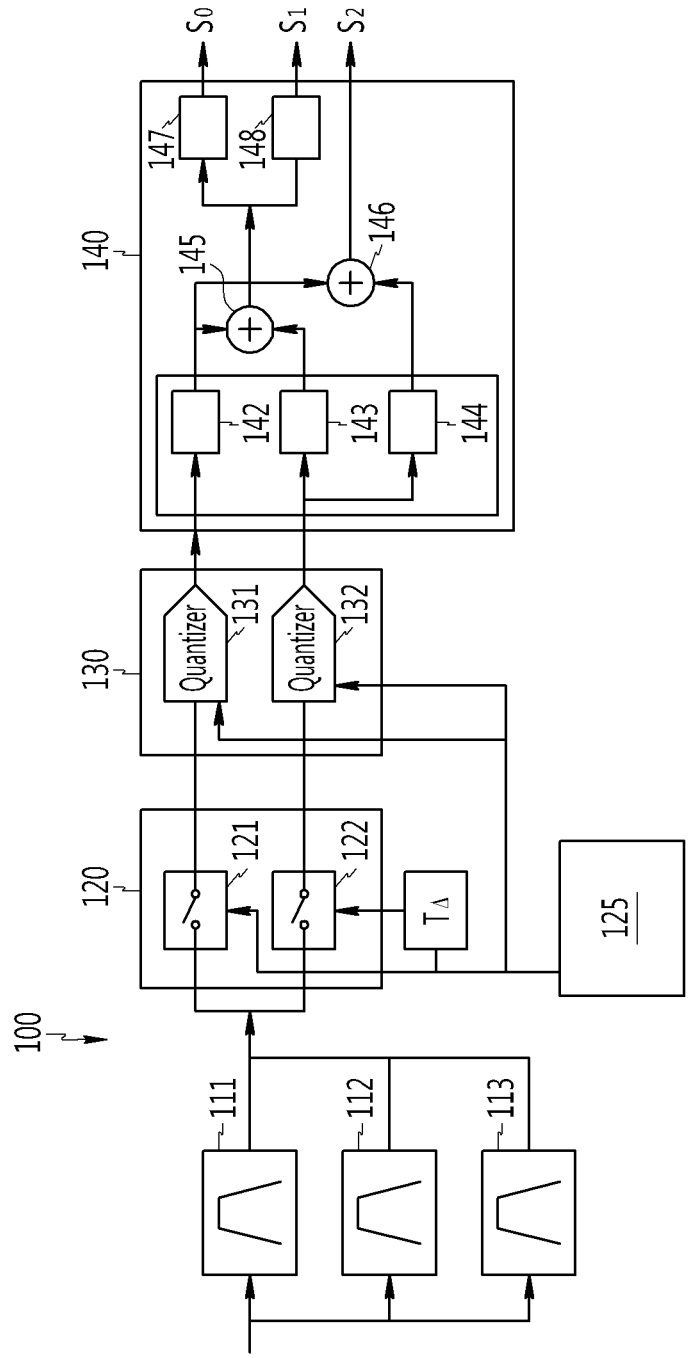
FIG. 1 is a block diagram of a receiving apparatus according to one exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Now, a receiving apparatus and a receiving method according to one exemplary embodiment of the present invention will be described in detail with reference to the accompanying drawings.

Figure 2:
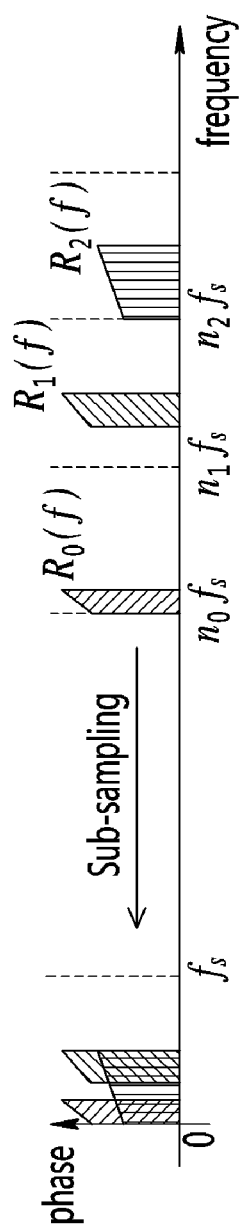
FIG. 2 is a view illustrating RF signals and a baseband signal down-converted by the receiving apparatus of FIG. 1.
Figure 3:
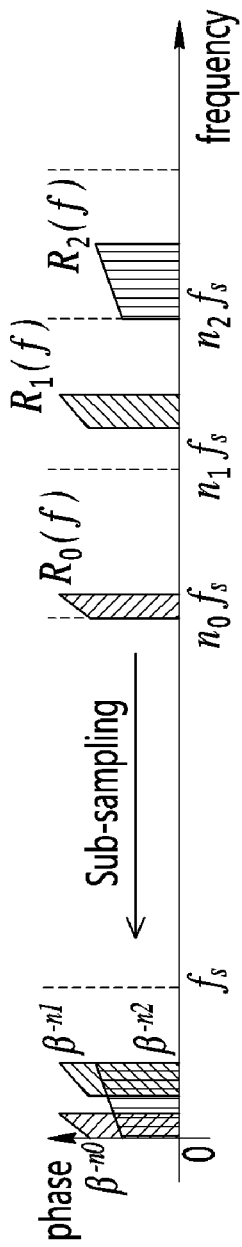
FIG. 3 is a view illustrating the RF signals shown in FIG. 2 and a phase shift generated by the down-conversion to the baseband by the receiving apparatus of FIG. 1.
Figure 4:
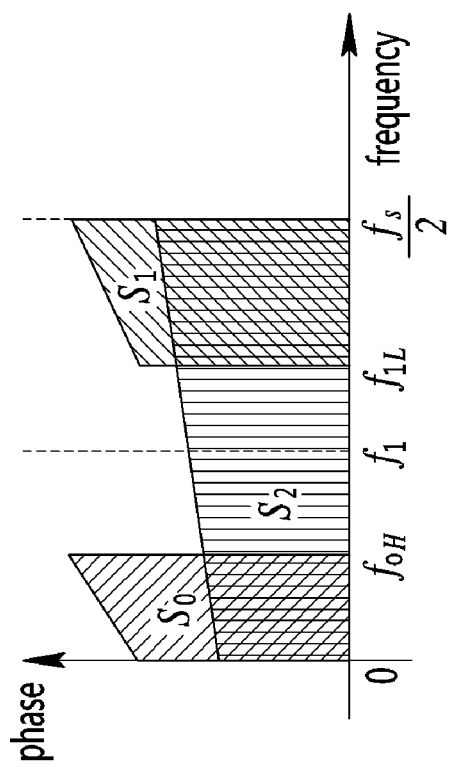
FIG. 4 is a view illustrating three signals output by the receiving apparatus according to one exemplary embodiment of the present invention.

FIG. 1 is a block diagram of a receiving apparatus according to one exemplary embodiment of the present invention, FIG. 2 is a view illustrating RF signals and a baseband signal down-converted by the receiving apparatus of FIG. 1, FIG. 3 is a view illustrating the RF signals shown in FIG. 2 and a phase shift generated by the down-conversion to the baseband by the receiving apparatus of FIG. 1, and FIG. 4 is a view illustrating three signals output by the receiving apparatus according to one exemplary embodiment of the present invention.

Referring to FIG. 1, a receiving apparatus 100 is an apparatus that receives and processes radio frequency (RF) signals $R_0(f)$, $R_1(f)$, and $R_2(f)$ and outputs down-converted signals $S_0$, $S_1$, and $S_2$.

Referring to FIGS. 2 and 3, it is assumed that the RF signals $R_0(f)$, $R_1(f)$, and $R_2(f)$ having three different bands are respectively located in $n_o$-th, $n_1$-th, and $n_2$-th regions of a frequency area divided into intervals of a sample rate fs. The receiving apparatus 100 according to one exemplary embodiment of the present invention outputs three signals of different bands separately using the fact that different frequency areas where the RF signals $R_0(f)$, $R_1(f)$, and $R_2(f)$ are located result in different phase shifts caused by the down-conversion of the RF signals $R_0(f)$, $R_1(f)$, and $R_2(f)$. That is, each signal can be separated using the fact that aliasing generated by the sub-sampling of the three RF signals ($R_0(f)$, $R_1(f)$, and $R_2(f)$ and the overlapping of the signals at the baseband result in different phase shift values $\beta^{-n0}$, $\beta^{-n1}$, and $\beta^{-n2}$.

Signals $S_0$, $S_1$, and $S_2$ output by the receiving apparatus according to one exemplary embodiment of the present invention are signals that are down-converted from the RF signals $R_0(f)$, $R_1(f)$, and $R_2(f)$ and output separately as shown in FIG. 4.

Referring to FIG. 4, frequency $f_1$ is defined as the center frequency of the signals $S_0$ and $S_1$ as in the following Equation 1.

$$f_1 = f_{0H} + (f_{1L} - f_{0H})/2 \qquad \text{[Equation 1]}$$

where frequency $f_{oH}$ is the high bound frequency of the signal $S_0$ and frequency $f_{1L}$ is the low bound frequency of the signal $S_1$.

Referring again to FIG. 1, the receiving apparatus 100 includes RF filters 111, 112, and 113, a phase conversion unit 120, a clock generation unit 125, a quantization unit 130, and a signal separation unit 140.

Each of the RF filters 111, 112, and 113 simultaneously receives the three RF signals $R_0(f)$, $R_1(f)$, $R_2(f)$ having different bands received by an antenna and select an RF signal to be down-converted, and eliminates an noise and aliasing of the selected RF signal. Thus, the filters 111, 112, and 113 may be turnable band pass filters. Each of the filters 111, 112, and 113 may include a low noise amplifier (LNA).

The phase conversion unit 120 down-converts the RF signal selected from among the RF filters 111, 112, and 113 into a sample signal by using a preset sampling frequency fs. The sampling frequency fs may be set to be at least twice 2B the bandwidth B of the RF signal. The phase conversion unit 120 may include two samplers 121 and 122. The two samplers 121 and 122 may receive clock signals having a time difference of $T_A$ from the clock generation unit 125, and generate two sample signals having the time difference of $T_A$. Accordingly, a phase difference between the two sample signals may be generated.

The clock generation unit 125 generates the clock signals having a time difference. The clock generation unit 125 distributes the generated clock signals into the phase conversion unit 120 and the quantization unit 130.

The quantization unit 130 converts two sample signals with a phase difference into digital signals and generates sample streams with different phases, and transmits the sample streams to the signal separation unit 140.

The signal separation unit 140 receives the two sample streams with different phases and outputs the three signals $S_o$, $S_1$, and $S_2$ separately using the different phase shift values of the two sample streams, and includes interpolants 142, 143, and 144, adders 145 and 146, a low pass filter 147, and a high pass filter 148.

The interpolants 142, 143, and 144 are a kind of filters for restoring a desired signal only.

Output signals of the interpolants 142 and 143 are added by the adder 145, and the two signals $S_o$ and $S_1$ are separated by the low pass filter 147 and the high pass filter 148.

The output signals of the interpolants 142 and 144 are added by the adder 146 and the signal $S_2$ is separated.

The filter coefficient value of the interpolant 142 can be represented by $S_A(f)$, and can be designed as in the following Equation 2.

$$S_A(f) = \begin{cases} 1/B & |f| < B \\ 0 & \text{otherwise} \end{cases} \quad \text{[Equation 2]}$$

That is, if the absolute value of the frequency f of a signal is less than a bandwidth B, the filter coefficient value of the interpolant 142 is the reciprocal of the bandwidth and otherwise 0.

The filter coefficient value of the interpolant 143 can be represented by $S_{B1}(f)$, and can be designed as in the following Equation 3.

$$S_{B1}(f) = \begin{cases} \dfrac{-\beta^{-n2}}{B} & -B < f < 0 \\ \dfrac{-\beta^{n2}}{B} & 0 < f < B \\ 0 & \text{otherwise} \end{cases} \quad \text{[Equation 3]}$$

That is, if the frequency is between a negative value of the bandwidth and 0, the filter coefficient value of the interpolant 143 is a value obtained by dividing a negative value of the phase shift of a negative frequency component of the RF signal $R_2(f)$ by the bandwidth, and if the frequency is between 0 and the bandwidth, the filter coefficient value of the interpolant 143 is a value obtained by dividing a negative value of the phase shift of a positive frequency component of the RF signal $R_2(f)$ by the bandwidth, and otherwise 0.

The low pass filter 147 for separating the signal $S_o$ from among the two signals $S_o$, $S_1$ separated by the interpolants 142 and 143 can be represented by $S_{LP}(f)$, and can be designed as in the following Equation 4.

$$S_{LP}(f) = \begin{cases} 1 & [0, f_1] \\ 0 & \text{otherwise} \end{cases} \quad \text{[Equation 4]}$$

That is, if the frequency is between 0 and the center frequency $f_1$, the output value, i.e., signal $S_o$, of the low pass filter 147 is 1 and otherwise 0.

The high pass filter 148 for separating the signal $S_1$ from among the two signals $S_o$ and $S_1$ separated by the interpolants 142 and 143 can be represented by $S_{HP}(f)$, and can be designed as in the following Equation 5.

$$S_{HP}(f) = \begin{cases} 1 & [f_1, f_s/2] \\ 0 & \text{otherwise} \end{cases} \quad \text{[Equation 5]}$$

That is, if the frequency is between the center frequency $f_1$ and half of the sampling frequency $f_s$, the output value, i.e., signal $S_1$, of the high pass filter 148 is 1 and otherwise 0.

The filter coefficient value of the interpolant 144 can be represented by $S_{B2}(f)$, and can be designed as in the following Equation 6.

$$S_{B2}(f) = \begin{cases} \dfrac{-\beta^{-n1}}{B} & -f_s/2 < f < -f_1 \\ \dfrac{-\beta^{-n0}}{B} & -f_1 < f < 0 \\ \dfrac{-\beta^{n0}}{B} & 0 < f < f_1 \\ \dfrac{-\beta^{n1}}{B} & f_1 < f < f_s/2 \\ 0 & \text{otherwise} \end{cases} \quad \text{[Equation 6]}$$

That is, if the frequency is between a negative value of half the sampling frequency $f_s$ and a negative value of the center frequency $f_1$, the filter coefficient value of the interpolant 144 is a value obtained by dividing a negative value of the phase shift of a negative frequency component of the RF signal $R_1(f)$, if the frequency is between a negative value of the center frequency $f_1$ and 0, the filter coefficient value of the interpolant 144 is a value obtained by dividing a negative value of the phase shift of a negative frequency component of the RF signal $R_0(f)$ by the bandwidth, if the frequency is between 0 and the center frequency $f_1$, the filter coefficient value of the interpolant 144 is a value obtained by dividing a negative value of the phase shift of a positive frequency component of the RF signal $R_0(f)$ by the bandwidth, if the frequency is between the center frequency $f_1$ and half of the sampling frequency $f_s$, the filter coefficient value of the interpolant 144 is a value obtained by dividing a negative value of the phase shift of a positive frequency component of the RF signal $R_1(f)$ by the bandwidth, and otherwise 0.

As such, by designing the interpolants 142, 143, and 144, the low pass filter 147, and the high pass filter 148 as in Equations 2 to 6, three RF signals located in different frequency bands can be simultaneously received at the baseband without interference.

Moreover, even when the signals $R_0(f)$ and $R_1(f)$ are signals to be received and the signal $R_2(f)$ exists as an interference signal, the signals $R_0(f)$ and $R_1(f)$ can be properly received by eliminating the signal $R_2(f)$ only from the signals to be received.

Now, a receiving method according to one exemplary embodiment of the present invention will be described in detail with reference to FIG. 5.

Figure 5:
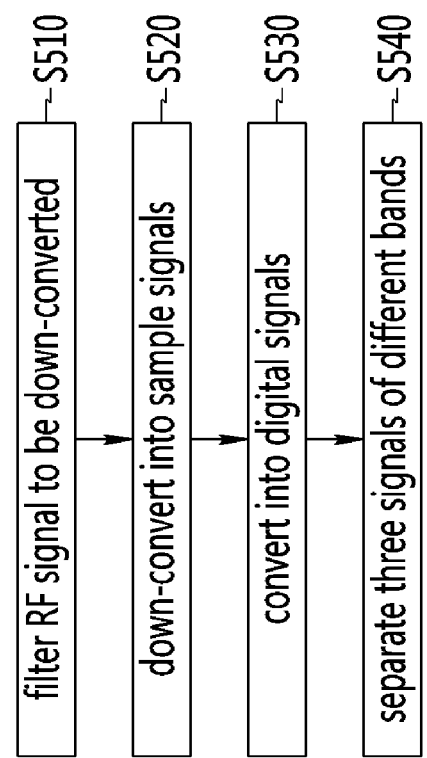
FIG. 5 is a flowchart illustrating a receiving method of a receiving apparatus according to one exemplary embodiment of the present invention.

FIG. 5 is a flowchart illustrating a receiving method of a receiving apparatus 100 according to one exemplary embodiment of the present invention.

Referring to FIG. 5, the receiving apparatus 100 receives three RF signals of different bands from an antenna and selects and filters an RF signal to be down-converted (S510).

Subsequently, the receiving apparatus 100 down-converts the filtered RF signal into sample signals by using a preset sampling frequency (S520). Clock signals having a time difference may be inserted so that the sample signals have a phase difference. The preset sampling frequency may be set to be at least twice as wide as the bandwidth.

Afterwards, the receiving apparatus 100 converts the sample signals from discrete signals into digital signals (S530).

The receiving apparatus 100 separates the three down-converted signals existing in different bands from the converted digital signals and outputs them (S540). At this point, the three signals can be separated and output without interference by using the interpolants, the low pass filter, and the high pass filter designed according to the aforementioned Equations 2 to 6.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A receiving apparatus comprising:
   RF filters for selecting and outputting a signal to be down-converted from among a plurality of received signals having different bands;
   a phase conversion unit for generating a phase difference between output signals of the filters and down-converting the output signals of the filters to output a plurality of sample signals;
   a quantization unit for converting the plurality of sample signals from discrete signals into digital signals; and
   a signal separation unit for separating and outputting each of a plurality of output signals corresponding to the plurality of received signals from the output signals of the quantization unit by using a phase shift value caused by the phase difference,
   wherein the plurality of received signals comprise a first received signal, a second received signal, and a third received signal, and the plurality of output signals comprise a first output signal corresponding to the first received signal, a second output signal corresponding to the second received signal, and a third output signal corresponding to the third received signal, and
   wherein the signal separation unit comprises:
      a first interpolant for receiving a first signal, which is any one of the output signals of the quantization unit, and outputting a fourth output signal;
      a second interpolant for receiving a second signal, which is any one of the output signals of the quantization unit, and outputting a fifth output signal;
      a first adder for adding the fourth output signal and the fifth output signal;
      a low pass filter for receiving the addition result of the first adder and selecting and outputting the first output signal; and
      a high pass filter for receiving the addition result of the first adder and selecting and outputting the second output signal.

2. The apparatus of claim 1, wherein, if the absolute value of a frequency is less than a bandwidth, the filter coefficient value of the first interpolant is the reciprocal of the bandwidth and otherwise the filter coefficient value of the first interpolant is 0.

3. The apparatus of claim 1, wherein, if the frequency is between a negative value of the bandwidth and 0, the filter coefficient value of the second interpolant is a value obtained by dividing a negative value of the phase shift of a negative frequency component of the third received signal by the bandwidth,
   if the frequency is between 0 and the bandwidth, the filter coefficient value of the second interpolant is a value obtained by dividing a negative value of the phase shift of a positive frequency component of the third received signal by the bandwidth, and
   otherwise the filter coefficient value of the second interpolant is 0.

4. The apparatus of claim 1, wherein, if the frequency is between 0 and the center frequency of the first output signal and the second output signal, the first output signal is 1 and otherwise the first output signal is 0.

5. The apparatus of claim 4, wherein if the frequency is between the center frequency and half of a sampling frequency, the second output signal is 1 and otherwise the second output signal is 0.

6. The apparatus of claim 1, wherein the signal separation unit further comprises:
   a third interpolant for receiving the second signal and outputting a sixth output signal; and
   a second adder for adding the fourth output signal and the sixth output signal to output the third output signal.

7. The apparatus of claim 6, wherein, if the frequency is between a negative value of half a sampling frequency and a negative value of the center frequency of the first output signal and the second output signal, the filter coefficient value of the third interpolant is a value obtained by dividing a negative value of the phase shift of a negative frequency component of the second received signal by the bandwidth,
   if the frequency is between a negative value of the center frequency and 0, the filter coefficient value of the third interpolant is a value obtained by dividing a negative value of the phase shift of a negative frequency component of the first received signal by the bandwidth,
   if the frequency is between 0 and the center frequency, the filter coefficient value of the third interpolant is a value obtained by dividing a negative value of the phase shift of a positive frequency component of the first received signal by the bandwidth,
   if the frequency is between the center frequency and half of the sampling frequency, the filter coefficient value of the third interpolant is a value obtained by dividing a negative value of the phase shift of a positive frequency component of the second received signal by the bandwidth, and
   otherwise the filter coefficient value of the third interpolant is 0.

8. The apparatus of claim 1, wherein the phase conversion unit comprises a first sampler and a second sampler, wherein the quantization unit comprises a first quantization unit and a second quantization unit corresponding to the first sampler and the second sampler, respectively.

9. The apparatus of claim 1, wherein the RF filters comprise at least one bandpass filter.

10. A receiving apparatus, which down-converts a first received signal, second received signal, and third received signal of different bands having different phase shift values, and outputs a first output signal corresponding to the first received signal, a second output signal corresponding to the second received signal, and a third output signal corresponding to the third received signal, the apparatus comprising:

a first interpolant that has a filter coefficient value equal to the reciprocal of a bandwidth if the absolute value of a frequency is less than the bandwidth, and otherwise a filter coefficient value of 0, and outputs a fourth output signal;

a second interpolant that has a filter coefficient value equal to a value obtained by dividing a negative value of the phase shift of a negative frequency component of the third received signal by the bandwidth if the frequency is between a negative value of the bandwidth and 0, a filter coefficient value equal to a value obtained by dividing a negative value of the phase shift of a positive frequency component of the third received signal by the bandwidth if the frequency is between 0 and the bandwidth, and otherwise a filter coefficient value of 0, and outputs a fifth output signal;

a first adder for adding the fourth output signal and the fifth output signal to output a sixth output signal;

a low pass filter that receives the sixth output signal and outputs 1 as the first output signal if the frequency is between 0 and the center frequency of the first output signal and the second output signal, and otherwise 0;

a high pass filter that receives the sixth output signal and outputs 1 as the second output signal if the frequency is between the center frequency and half of a sampling frequency, and otherwise 0;

a third interpolant that has a filter coefficient value equal to a value obtained by dividing a negative value of the phase shift of a negative frequency component of the second received signal by the bandwidth if the frequency is between a negative value of half the sampling frequency and a negative value of the center frequency, a filter coefficient value equal to a value obtained by dividing a negative value of the phase shift of a negative frequency component of the first received signal by the bandwidth if the frequency is between a negative value of the center frequency and 0, a filter coefficient value equal to a value obtained by dividing a negative value of the phase shift of a positive frequency component of the first received signal by the bandwidth if the frequency is between 0 and the center frequency, a filter coefficient value equal to a value obtained by dividing a negative value of the phase shift of a positive frequency component of the second received signal by the bandwidth if the frequency is between the center frequency and half of the sampling frequency, and otherwise a filter coefficient value of 0, and outputs a seventh output signal; and a second adder for adding the fourth output signal and the seventh output signal to output the third output signal.

11. A receiving method, which receives a plurality of received signals having different bands, the method comprising:

generating a phase difference between the plurality of received signals and down-converting the plurality of received signals to output a plurality of sample signals;

converting the plurality of sample signals from discrete signals into digital signals; and separating and outputting each of a plurality of output signals corresponding to the plurality of received signals from the plurality of sample signals converted into the digital signals by using a phase shift value caused by the phase difference, wherein the plurality of received signals comprise a first received signal, a second received signal, and a third received signal, and the plurality of output signals comprise a first output signal corresponding to the first received signal, a second output signal corresponding to the second received signal, and a third output signal corresponding to the third received signal, wherein the separating and outputting comprise:

receiving a first signal included in the plurality of sample signals converted into the digital signals, and outputting a fourth output signal;

receiving a second signal included in the plurality of sample signals converted into the digital signals having different phase shift values, and outputting a fifth output signal;

adding the fourth output signal and the fifth output signal;

selecting and outputting the first output signal from the addition result;

selecting and outputting the second output signal from the addition result;

receiving the second signal and outputting a sixth output signal; and adding the fourth output signal and the sixth output signal to output the third output signal.

12. The method of claim 11, wherein the receiving of the first signal and outputting of the fourth output signal are performed based on a filter coefficient value which is equal to the reciprocal of a bandwidth if the absolute value of a frequency is less than a bandwidth and otherwise is 0.

13. The method of claim 11, wherein the receiving of the second signal and outputting of the fifth output signal are performed based on a filter coefficient value which is equal to a value obtained by dividing a negative value of the phase shift of a negative frequency component of the third received signal by the bandwidth if the frequency is between a negative value of the bandwidth and 0, is equal to a value obtained by dividing a negative value of the phase shift of a positive frequency component of the third received signal by the bandwidth if the frequency is between 0 and the bandwidth, and otherwise is 0.

14. The method of claim 11, wherein, if the frequency is between 0 and the center frequency of the first output signal and the second output signal, the first output signal is 1 and otherwise 0.

15. The method of claim 14, wherein, if the frequency is between the center frequency and half of a sampling frequency, the second output signal is 1 and otherwise 0.

16. The method of claim 11, wherein the receiving of the second signal and outputting of the sixth output signal are performed based on a filter coefficient value which is equal to a value obtained by dividing a negative value of the phase shift of a negative frequency component of the second received signal by the bandwidth if the frequency is between a negative value of half a sampling frequency and a negative value of the center frequency of the first output signal and the second output signal, is equal to a value obtained by dividing a negative value of the phase shift of a negative frequency component of the first received signal by the bandwidth if the frequency is between a negative value of the center frequency and 0, is equal to a value obtained by dividing a negative value of the phase shift of a positive frequency component of the first received signal by the bandwidth if the frequency is between 0 and the center frequency, is equal to a value obtained by dividing a negative value of the phase shift of a positive frequency component of the second received signal by the bandwidth if the frequency is between the center frequency and half of the sampling frequency, and otherwise is 0.

\* \* \* \* \*